(12) United States Patent
Archuleta et al.

(10) Patent No.: US 11,007,476 B2
(45) Date of Patent: May 18, 2021

(54) PROCESS EQUIPMENT CONTAMINANT REMOVAL

(71) Applicant: Global Vapor Control, Inc., Houston, TX (US)

(72) Inventors: Daryl Archuleta, Houston, TX (US); Lisha Salathiel, Houston, TX (US); Doug Scott, Houston, TX (US)

(73) Assignee: Global Vapor Control, Inc., Houston, TX (US)

( * ) Notice: Subject to any disclaimer, the term of this patent is extended or adjusted under 35 U.S.C. 154(b) by 53 days.

(21) Appl. No.: 16/680,204

(22) Filed: Nov. 11, 2019

(65) Prior Publication Data

US 2020/0078725 A1    Mar. 12, 2020

Related U.S. Application Data

(63) Continuation of application No. 16/113,689, filed on Aug. 27, 2018, now Pat. No. 10,518,211, which is a continuation of application No. 15/384,114, filed on Dec. 19, 2016, now Pat. No. 10,065,150, which is a continuation of application No. 14/512,983, filed on Oct. 13, 2014, now abandoned, which is a continuation-in-part of application No. 14/083,079, filed on Nov. 18, 2013, now Pat. No. 9,415,338, which is a continuation of application No. 13/650,609, filed on Oct. 12, 2012, now Pat. No. 8,613,895.

(Continued)

(51) Int. Cl.
*B01D 53/75* (2006.01)
*B01D 53/44* (2006.01)
*B01D 53/26* (2006.01)
*B01D 53/00* (2006.01)

(52) U.S. Cl.
CPC ......... *B01D 53/266* (2013.01); *B01D 53/005* (2013.01); *B01D 53/44* (2013.01); *B01D 53/75* (2013.01); *B01D 2257/702* (2013.01); *B01D 2257/80* (2013.01)

(58) Field of Classification Search
CPC   B01D 53/266; B01D 46/0027; B01D 53/005; B01D 2257/80; B01D 53/75; B01D 2257/702; B01D 53/44
See application file for complete search history.

(56) References Cited

U.S. PATENT DOCUMENTS 3,295,298 A    1/1967   Mackey
4,069,154 A    1/1978   Barloy
(Continued)

OTHER PUBLICATIONS

International Search Report and Written Opinion for International Application No. PCT/US2012/059944 dated Dec. 24, 2012.
(Continued)

*Primary Examiner* — Timothy C Vanoy
(74) *Attorney, Agent, or Firm* — Tumey L.L.P.

(57) ABSTRACT

An apparatus, method and system remove contaminants from a vapor. In an embodiment, a contaminant removal apparatus includes a vacuum box. The vacuum box is a vessel. The apparatus also includes a demister pad disposed in the vacuum box. A vapor is introduced to the vacuum box on an opposing side of the demister pad from a vapor exit from the vacuum box.

20 Claims, 5 Drawing Sheets

Related U.S. Application Data

(60) Provisional application No. 61/546,105, filed on Oct. 12, 2011.

(56) References Cited

U.S. PATENT DOCUMENTS

| | | | |
|---|---|---|---|
| 4,359,828 A | 11/1982 | Thomas | |
| 4,594,747 A | 6/1986 | Dempsey | |
| 4,947,510 A | 8/1990 | English | |
| 6,110,361 A | 8/2000 | Bower et al. | |
| 8,613,895 B2* | 12/2013 | Finley | B01D 53/005 423/210 |
| 9,415,338 B2* | 8/2016 | Salathiel | C02F 9/00 |
| 10,065,150 B2* | 9/2018 | Archuleta | B01D 53/75 |
| 10,518,211 B2* | 12/2019 | Archuleta | B01D 53/005 |
| 2010/0282593 A1 | 11/2010 | Spiers et al. | |
| 2012/0282593 A1 | 11/2012 | McCullers et al. | |
| 2013/0129587 A1 | 5/2013 | Finley | |
| 2014/0069276 A1 | 3/2014 | Salathiel | |
| 2015/0027312 A1 | 1/2015 | Archuleta | |
| 2017/0095770 A1 | 4/2017 | Archuleta | |
| 2018/0361313 A1 | 12/2018 | Archuleta | |

OTHER PUBLICATIONS

USPTO Non-Final Office Action for U.S. Appl. No. 14/512,983 dated Oct. 14, 2015.
USPTO Notice of Allowance for U.S. Appl. No. 14/512,983 dated Sep. 19, 2016.
USPTO Notice of Allowance for U.S. Appl. No. 14/512,983 dated Jun. 8, 2016.
USPTO Notice of Allowance for U.S. Appl. No. 14/512,983 dated Feb. 26, 2016.
USPTO Notice of Allowance for U.S. Appl. No. 14/083,079 dated May 20, 2016.
USPTO Notice of Allowance for U.S. Appl. No. 14/083,079 dated Jul. 2, 2014.
USPTO Notice of Allowance for U.S. Appl. No. 13/650,609 dated Aug. 16, 2013.
USPTO Notice of Allowance for U.S. Appl. No. 13/650,609 dated May 6, 2013.
International Preliminary Report on Patentability for Application No. PCT/US2015/055232 dated Apr. 18, 2017.
USPTO Non-Final Office Action for U.S. Appl. No. 15/384,114 dated Oct. 13, 2017.
USPTO Notice of Allowance for U.S. Appl. No. 15/384,114 dated May 10, 2018.
USPTO Notice of Allowance for U.S. Appl. No. 16/113,689 dated Aug. 12, 2019.
USPTO Issue Notification for U.S. Appl. No. 13/650,609 dated Dec. 4, 2013.
USPTO Issue Notification for U.S. Appl. No. 14/083,079 dated Jul. 27, 2016.
USPTO Issue Notification for U.S. Appl. No. 15/384,114 dated Aug. 21, 2018.

* cited by examiner

PROCESS EQUIPMENT CONTAMINANT REMOVAL

CROSS-REFERENCE TO RELATED APPLICATIONS

This application is a continuation that claims the benefit of U.S. application Ser. No. 16/113,689 filed on Aug. 27, 2018, which is a continuation application that claims benefit of U.S. application Ser. No. 15/384,114 filed on Dec. 19, 2016 that issued as U.S. Pat. No. 10,065,150 on Sep. 4, 2018, which is a continuation application that claims the benefit of U.S. application Ser. No. 14/512,983 filed on Oct. 13, 2014, which is a continuation-in-part application that claims the benefit of U.S. application Ser. No. 14/083,079 filed on Nov. 18, 2013 that issued as U.S. Pat. No. 9,415,338 on Aug. 16, 2016, which is a continuation application that claims the benefit of U.S. application Ser. No. 13/650,609 filed on Oct. 12, 2012 that issued as U.S. Pat. No. 8,613,895 on Dec. 24, 2013, which is a non-provisional application that claims the benefit of U.S. Application Ser. No. 61/546,105 filed on Oct. 12, 2011, the entire disclosures of which are herein incorporated by reference in their entireties.

STATEMENT REGARDING FEDERALLY SPONSORED RESEARCH OR DEVELOPMENT

Not applicable.

BACKGROUND OF THE INVENTION

Field of the Invention

This invention relates to the field of chemical and industrial facilities and more specifically to removing water from a vapor using a vacuum box.

Background of the Invention

There is an increased need for improving efficiency and reducing environmental concerns in the cleaning of industrial equipment such as process towers and the like. For instance, equipment holding hydrocarbons or other contaminants is cleaned for a variety of reasons such as for maintenance or a plant turnaround. Such maintenance and plant turnarounds typically involve accessing the equipment. Before the equipment may be accessed, the hydrocarbons and other contaminants are often removed from the equipment. A variety of conventional processes have been used to remove the hydrocarbons and other contaminants from the equipment. Such conventional processes include using steam to remove the hydrocarbons and other contaminants. Drawbacks to such conventional processes include disposal of the removed hydrocarbons and other contaminants. For instance, the steam exiting the equipment (e.g., process tower) may contain hydrocarbons and other contaminants.

Methods have been developed to dispose of such removed hydrocarbons and other contaminants. Such developments include processing the steam to remove the hydrocarbons and other contaminants. For instance, such developments include flaring the steam. Drawbacks to flaring the steam include environmental issues such as organic levels of the flare.

Consequently, there is a need for an improved method and system for cleaning process equipment. Further needs include improved methods and systems for removing contaminants such as hydrocarbons from a vapor (e.g., steam). Additional needs include improved equipment for removing hydrocarbons and other contaminants from a vapor such as steam.

BRIEF SUMMARY OF SOME OF THE PREFERRED EMBODIMENTS

These and other needs in the art are addressed in one embodiment by a contaminant removal system having a vacuum box. A contaminated vapor from process equipment is introduced to the vacuum box. The contaminated vapor includes steam and hydrocarbons. The vacuum box includes a water removal device. The water removal device removes water from the contaminated vapor to provide water and a reduced water vapor. The contaminated vapor is introduced to the vacuum box below the water removal device. The water and the reduced water vapor are removed from the vacuum box. In addition, the water removal device is disposed in the vacuum box at an elevation below an elevation at which the reduced water vapor is removed from the vacuum box.

These and other needs in the art are addressed in another embodiment by a method for removing contaminants from process equipment. The method includes introducing steam to the process equipment to provide a contaminated vapor. The method also includes introducing the contaminated vapor to a vacuum box. The contaminated vapor includes steam and hydrocarbons. The method further includes removing water from the contaminated vapor. The vacuum box includes a water removal device. The water removal device removes water from the contaminated vapor to provide water and a reduced water vapor. In addition, the method includes removing the water and the reduced water vapor from the vacuum box. The reduced water vapor is removed from the vacuum box at an elevation above an elevation at which the water removal device is disposed in the vacuum box.

In addition, these and other needs in the art are addressed by a contaminant removal apparatus. The contaminant removal apparatus includes a vacuum box. The vacuum box includes a vessel. The contaminant removal apparatus also includes a demister pad disposed in the vacuum box. A vapor is introduced to the vacuum box on an opposing side of the demister pad from a vapor exit from the vacuum box.

Further, these and other needs in the art are addressed by a method for removing contaminants from process equipment. The method includes introducing steam to the process equipment to provide a contaminated vapor. The method also includes introducing the contaminated vapor to a vacuum box, wherein the contaminated vapor comprises steam and hydrocarbons. The method further includes removing water from the contaminated vapor, wherein the vacuum box comprises a water removal device, and wherein the water removal device removes water from the contaminated vapor to provide water and a reduced water vapor. In addition, the method includes removing the water and the reduced water vapor from the vacuum box, wherein the reduced water vapor is removed from an opposing side of the vacuum box from a side of the vacuum box at which the contaminated water is introduced to the vacuum box.

The foregoing has outlined rather broadly the features and technical advantages of the present invention in order that the detailed description of the invention that follows may be better understood. Additional features and advantages of the invention will be described hereinafter that form the subject of the claims of the invention. It should be appreciated by those skilled in the art that the conception and the specific embodiments disclosed may be readily utilized as a basis for modifying or designing other embodiments for carrying out the same purposes of the present invention. It should also be realized by those skilled in the art that such equivalent embodiments do not depart from the spirit and scope of the invention as set forth in the appended claims.

BRIEF DESCRIPTION OF THE DRAWINGS

For a detailed description of the preferred embodiments of the invention, reference will now be made to the accompanying drawings in which.

DETAILED DESCRIPTION OF THE PREFERRED EMBODIMENTS

Figure 1:
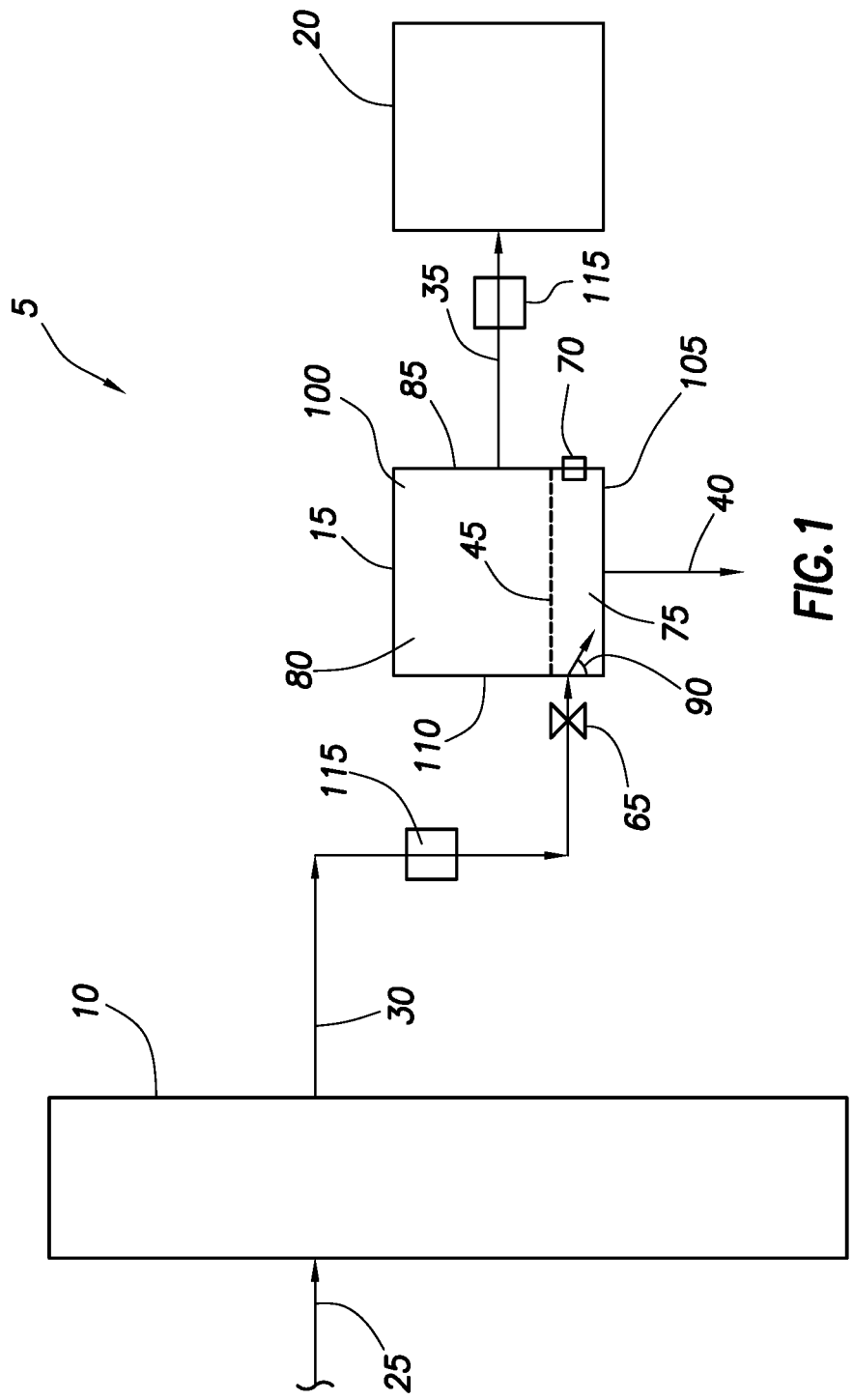
FIG. 1 illustrates an embodiment of a contaminant removal system having a vacuum box.

FIG. 1 illustrates an embodiment of contaminant removal system 5 having process equipment 10 and vacuum box 15. Embodiments include using steam to remove contaminants from process equipment 10. Water 40 is removed from the vapor (e.g., contaminated vapor 30) exiting process equipment 10 by vacuum box 15. By vacuum box 15 removing water 40 from contaminated vapor 30, the vapor (e.g., reduced water vapor 35) is available for further processing such as by a thermal destruction device 20.

In embodiments as shown in FIG. 1, vacuum box 15 includes any vessel suitable for allowing a vacuum to be pulled on a vapor and in which water is to be removed from the vapor. In embodiments, contaminated vapor 30 exits process equipment 10 and is introduced to vacuum box 15. A vacuum is created in vacuum box 15 as contaminated vapor 30 flows through and exits vacuum box 15.

In embodiments, vacuum box 15 is a pressure vessel. It is to be understood that a pressure vessel is a closed container used to hold liquids, gases, and/or vapors at a pressure substantially different than the ambient pressure. Without limitation, a pressure vessel may be a vessel that is a closed container of limited length, as compared to the indefinite length of piping. Pressure vessels may be constructed of any sufficient material including, but not limited to steel, ceramic, concrete, plastic, graphite, carbon fiber, composites thereof, or any combinations thereof. Additionally, pressure vessels may be lined with any sufficient material including, but not limited to ceramic, glass, rubber, plastics, rare metals, composites thereof, or any combinations thereof. Without limitation, a pressure vessel may comprise any shape, examples of which may include spheres, cylinders, or cones.

With continued reference to FIG. 1, in embodiments, vacuum box 15 includes water removal device 45, which removes water 40 from the contaminated vapor 30 as it flows through vacuum box 15. Water removal device 45 includes any device suitable for removing water from a vapor. In an embodiment, water removal device 45 is a demister pad. Any demister pad configuration suitable for removing the water may be used. In embodiments, the demister pad includes orifices through which the vapor passes, with the removed water collected in bottom portion 75 of vacuum box 15. In an embodiment, the demister pad extends about horizontally across vacuum box 15. The demister pad may be attached to vacuum box 15 by any suitable means. In an embodiment, clips are secured to vacuum box 15, and the demister pad is attached to the clips. The clips may be secured to vacuum box 15 by any suitable means such as by welds, adhesives, bolts, and the like. In an embodiment, the clips are welded to vacuum box 15. The demister pad is attached to the clips by any suitable means such as by welds, adhesives, bolts, and the like. In an embodiment, the demister pad is attached to the clips by bolts. It is to be understood that vacuum box 15 is not limited to a configuration with the demister pad extending horizontally but in alternative embodiments may include other configurations of disposing the demister pad in vacuum box 15. In some embodiments, suitable vessels existing at the industrial facility are modified (i.e., on-site) to produce vacuum box 15.

As shown in the embodiments of FIG. 1 in which water removal device 45 is a demister pad, contaminated vapor 30 is introduced to vacuum box 15 below water removal device 45 and above the water level in vacuum box 15. In alternative embodiments, contaminated vapor 30 is introduced to vacuum box 15 about at the water level in vacuum box 15. In embodiments, water removal device 45 is disposed at an elevation in vacuum box 15 that is below the elevation at which reduced water vapor 35 exits vacuum box 15. In embodiments, contaminant removal system 5 has a back flow valve 65 on the feed of contaminated vapor 30 to vacuum box 15. Back flow valve 65 prevents the back flow of water from vacuum box 15 into the feed line of contaminated vapor 30 to vacuum box 15. Back flow valve 65 may be any valve suitable for preventing the flow of water back into the feed of contaminated vapor 30 to vacuum box 15. In embodiments, back flow valve 65 is a one-way valve. In embodiments, back flow valve 65 is a check valve. In an embodiment, vacuum box 15 has water level measurement device 70. Water level measurement device 70 may be any device suitable for measuring the level of water in vacuum box 15. Without limitation, examples of water level measurement devices 70 are a level sensor, a floating water level measuring device, a sight level, or any combinations thereof. In embodiments, water level measurement device 70 is a floating water level measuring device.

In embodiments of operation of vacuum box 15 as shown in FIG. 1, contaminated vapor 30 is introduced to bottom portion 75 of vacuum box 15 and flows from bottom portion 75 through water removal device 45 (i.e., through the orifices in demister pad) and into upper portion 80 of vacuum box 15. A portion or all of the water in contaminated vapor 30 is separated from the vapor and remains in bottom portion 75 with reduced water vapor 35 exiting vacuum box 15. Water level measuring device 70 measures the level of water in bottom portion 75. When the level is about at a target water level, water 40 is drained from vacuum box 15. In some embodiments, water level measuring device 70 and the draining of water 40 from vacuum box 15 are automated. Such automation may be by any suitable methods. Water 40 may be drained by any suitable means. In embodiments, bottom 105 of vacuum box 5 has one or more drains valves (not illustrated). In some embodiments, side 85 and/or side 110 may have one or more drain valves (not illustrated). The target water level may be any desired level. In embodiments, the target water level is about at or below the elevation at which contaminated vapor 30 is introduced to vacuum box 15. In some embodiments, the target level is about at or below the elevation at which contaminated vapor 30 is introduced to vacuum box 15 and between about 50 percent and about 85 percent of the height of bottom portion 75, alternatively about at or below the elevation at which contaminated vapor 30 is introduced to vacuum box 15 and between about 70 percent and about 80 percent of the height of bottom portion 75. The target level may also be any height or ranges of heights included within the above ranges.

As further shown in FIG. 1, embodiments of contaminant removal system 5 include reduced water vapor 35 being removed from side 85 of vacuum box 15. In embodiments, side 85 is on the opposing side of vacuum box 15 from side 110 at which contaminated vapor 30 is introduced to vacuum box 15. Without limitation, such location of the exit of reduced water vapor 35 may reduce or prevent crimp in a hose in embodiments in which reduced water vapor 35 exits vacuum box 15 via a hose. Further, without limitation, such location of the exit of reduced water vapor 35 may reduce or prevent water splash.

In some embodiments of contaminant removal system 5, contaminated vapor 30 is introduced into vacuum box 15 at entry angle 90. Entry angle 90 may be any desired angle. In embodiments, entry angle 90 is from about 30 degrees to about 90 degrees, alternatively from about 45 degrees to about 90 degrees, and alternatively from about 30 degrees to about 60 degrees, and further alternatively from about 45 degrees to about 65 degrees, and alternatively about 45 degrees. In embodiments, entry angle 90 is any angle or range of angles within the range of angles above.

Figure 6:
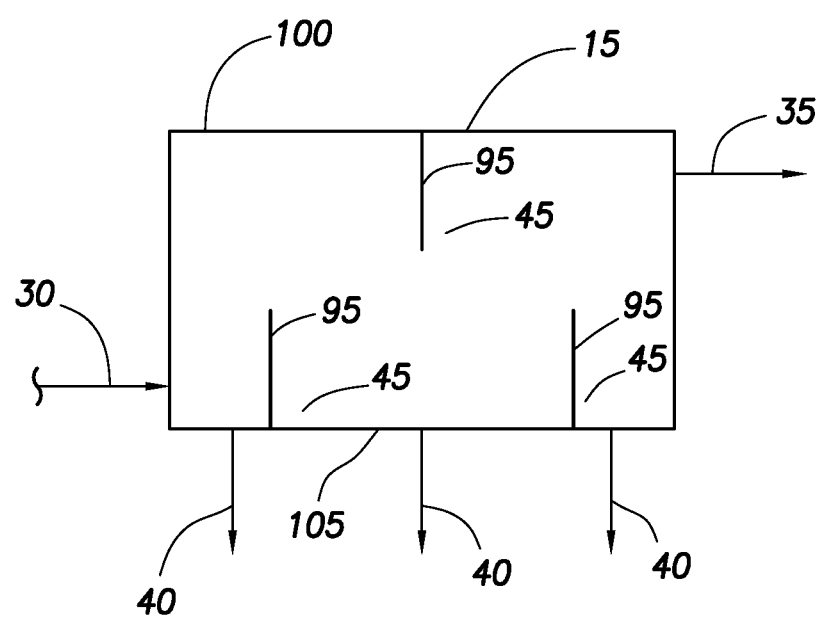
FIG. 6 illustrates an embodiment of a vacuum box in which the water removal device includes weirs.

In embodiments as shown in FIG. 6, water removal device 45 includes weirs 95. Weirs 95 may be disposed at any suitable location for removing water from contaminated vapor 30. In some embodiments as shown, weirs 95 are perpendicular to top 100 and bottom 105 of vacuum box 15. In embodiments, weirs 95 are solid.

In embodiments, contaminant removal system 5 includes sampling water 40 before removal from vacuum box 15. The sampling may be accomplished by any suitable means. In embodiments, contaminant removal system 5 may include a sample port disposed on one or more drains. In some embodiments, a sample port may be disposed on the line (i.e., hose) by which water 40 is drained from vacuum box 15. In an embodiment, water 40 is tested for chemical oxygen demand (e.g., COD). In embodiments, water 40 is drained to a container (not illustrated) and tested.

In further embodiments of contaminant removal system 5 as shown in FIG. 1, contaminant removal system 5 includes blowers 115. Blowers 115 may be any suitable device for increasing pressure on contaminated vapor 30 and/or reduced water vapor 35. In embodiments, blowers 115 are compressors. In embodiments, one or more blowers 115 may operate on contaminated vapor 30, and/or one or more blowers 115 may operate on reduced water vapor 35. Without limitation, blowers 115 have sufficient strength to maintain movement of the vapors (i.e., contaminated vapor 30 and reduced water vapor 35). Further, without limitation, maintaining such movement prevents or reduces condensation in a line.

In an embodiment of operation of contaminant removal system 5 as shown in FIG. 1, steam 25 is fed to process equipment 10. Steam 25 may be fed to process equipment 10 under any suitable conditions to remove hydrocarbons and other contaminants from process equipment 10. A commercial example of a suitable steam process is VAPOUR-PHASE®, which is a registered trademark of United Laboratories International, LLC. Steam 25 enters process equipment 10 and removes a portion or all of the hydrocarbons and other contaminants in process equipment 10. In embodiments, steam and an oxidizer enter process equipment 10 and remove a portion or all of the hydrocarbons and other contaminants in process equipment 10. Steam 25 with the hydrocarbons and other contaminants exits process equipment 10 as contaminated vapor 30. Contaminated vapor 30 is introduced to vacuum box 15. Contaminated vapor 30 flows through vacuum box 15 creating a vacuum in vacuum box 15. In embodiments, as contaminated vapor 30 passes through vacuum box 15 in a vacuum, water removal device 45 (e.g., demister pad) facilitates removal of a portion or all of the water in contaminated vapor 30. The water collects at bottom portion 75. In some embodiments (not illustrated), a pump or pumps may facilitate removal of water 40 from vacuum box 15. The pumps may be any suitable type of pump such as, without limitation, diaphragm pumps. Reduced water vapor 35 exits vacuum box 15 and may be further processed. In some embodiments, a portion or all of the hydrocarbons and other contaminants exit vacuum box 15 with reduced water vapor 35. Without limitation, the hydrocarbons and other contaminants leave with the gas because of the high temperatures involved. In an embodiment as shown, reduced water vapor 35 is fed to thermal destruction device 20.

Thermal destruction device 20 may be any device suitable for thermally destroying reduced water vapor 35. Without limitation, examples of thermal destruction devices 20 include thermal oxidizers, incinerators, and the like. Any thermal oxidizer may be used that is suitable for incinerating reduced water vapor 35. Without limitation, examples of thermal oxidizers include electric thermal oxidizers, gas fueled thermal oxidizers, and catalytic thermal oxidizers.

Figure 2:
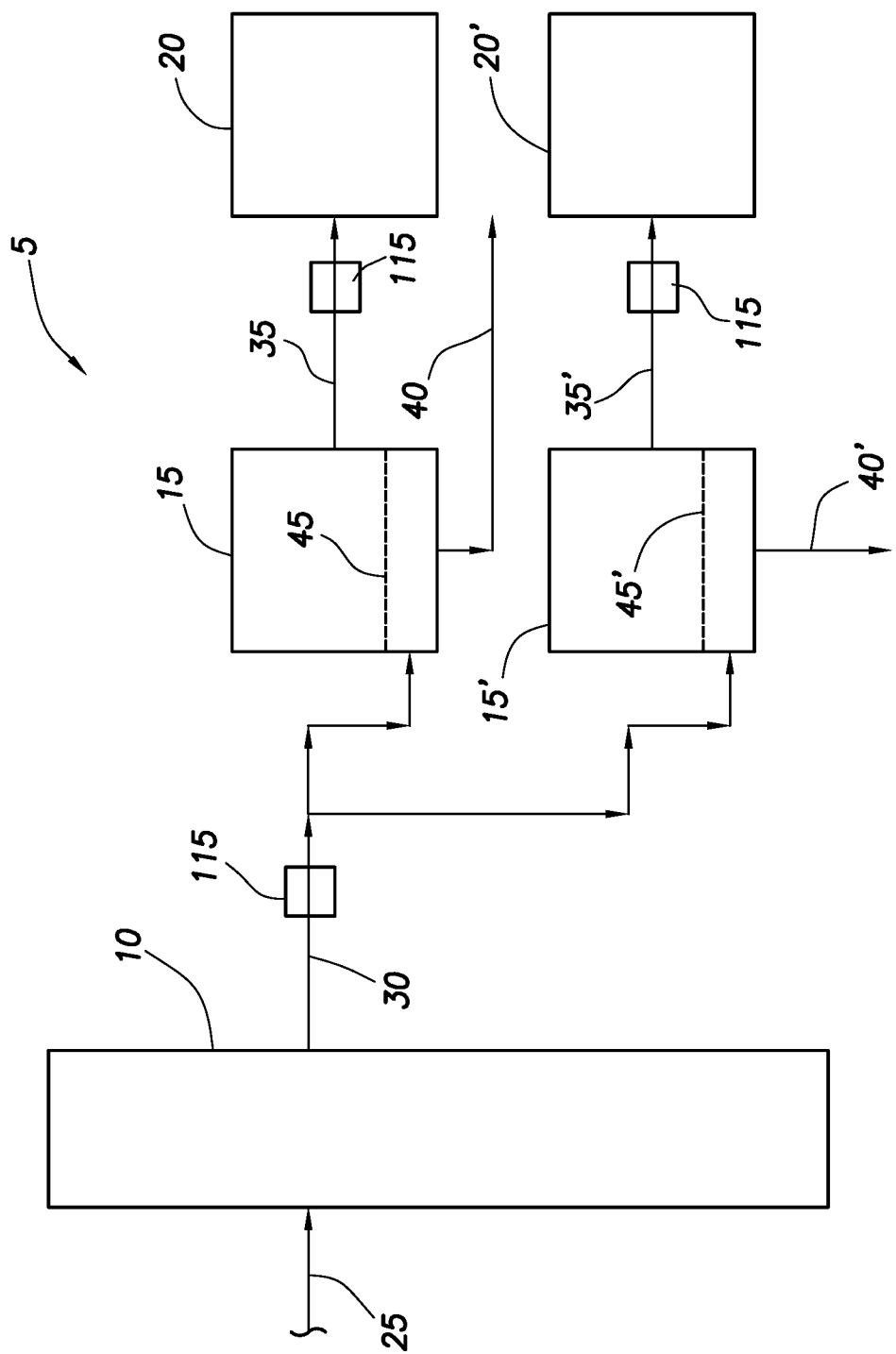
FIG. 2 illustrates an embodiment of a contaminant removal system having two vacuum boxes in a parallel configuration.

FIG. 2 illustrates an embodiment of contaminant removal system 5 having a parallel vacuum box 15 configuration. In such an embodiment, contaminant removal system 5 includes two vacuum boxes 15, 15' with contaminated vapor 30 being introduced to both. Vacuum boxes 15, 15' may be the same size and configuration or different sizes and configurations. In an embodiment, vacuum boxes 15, 15' are of the same size and configuration. Waters 40, 40' are removed from contaminated vapor 30 by vacuum boxes 15, 15', and reduced water vapors 35, 35' exit vacuum boxes 15, 15'. Water removal devices 45, 45' facilitate removal of waters 40, 40'. In embodiments as shown, reduced water vapor 35 is fed to thermal destruction device 20, and reduced water vapor 35' is fed to thermal destruction device 20'. In other embodiments (not illustrated), reduced water vapors 35, 35' may be fed to the same thermal destruction device. In an embodiment, vacuum boxes 15, 15' are disposed on the same transportation means (e.g., both disposed on the same trailer). In other embodiments, vacuum boxes 15, 15' are disposed on different transportation means.

Figure 3:
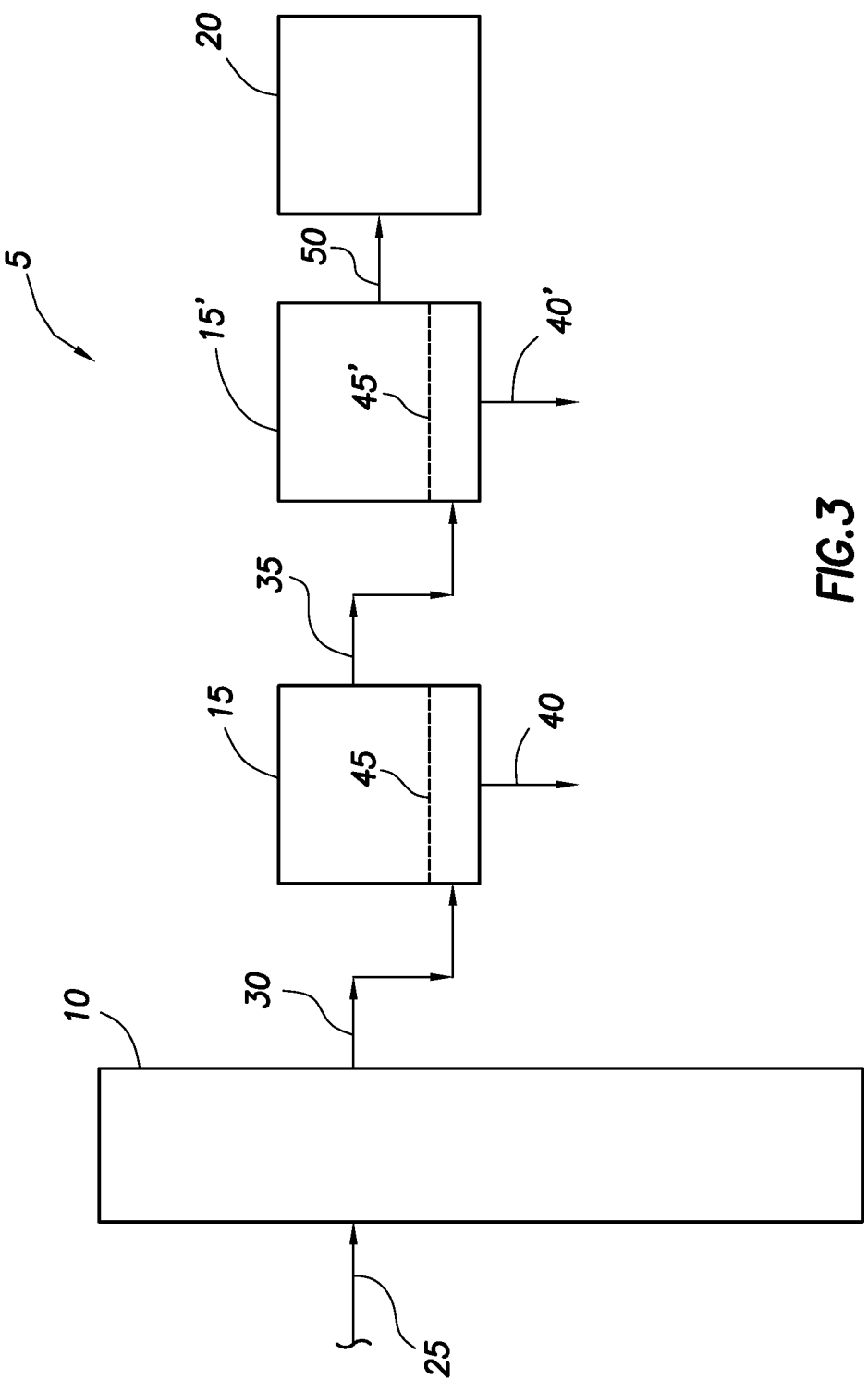
FIG. 3 illustrates an embodiment of a contaminant removal system having two vacuum boxes in a series configuration.

FIG. 3 illustrates an embodiment of contaminant removal system 5 having a series vacuum box 15 configuration. In such an embodiment, contaminant removal system 5 includes two vacuum boxes 15, 15' in the series configuration. Vacuum boxes 15, 15' may be the same size and configuration or different sizes and configurations. In an embodiment, vacuum boxes 15, 15' are of the same size and configuration. In some embodiments, each successive vacuum box is smaller than the previous vacuum box. In the embodiment as shown, contaminated vapor 30 is introduced to vacuum box 15 in which water removal device 45 (e.g., demister pad) facilitates removal of water 40 from contaminated vapor 30. Reduced water vapor 35 is then introduced to vacuum box 15' in which water removal device 45' facilitates removal of water 40' from reduced water vapor 35. Reduced water vapor 35 flowing through vacuum box 15' facilitates a vacuum in vacuum box 15'. Further reduced water vapor 50 exits vacuum box 15'. In embodiments as shown, further reduced water vapor 50 is fed to thermal destruction device 20. In an embodiment, vacuum boxes 15, 15' are disposed on the same transportation means (e.g., both disposed on the same trailer). In other embodiments, vacuum boxes 15, 15' are disposed on different transportation means.

Figure 4:
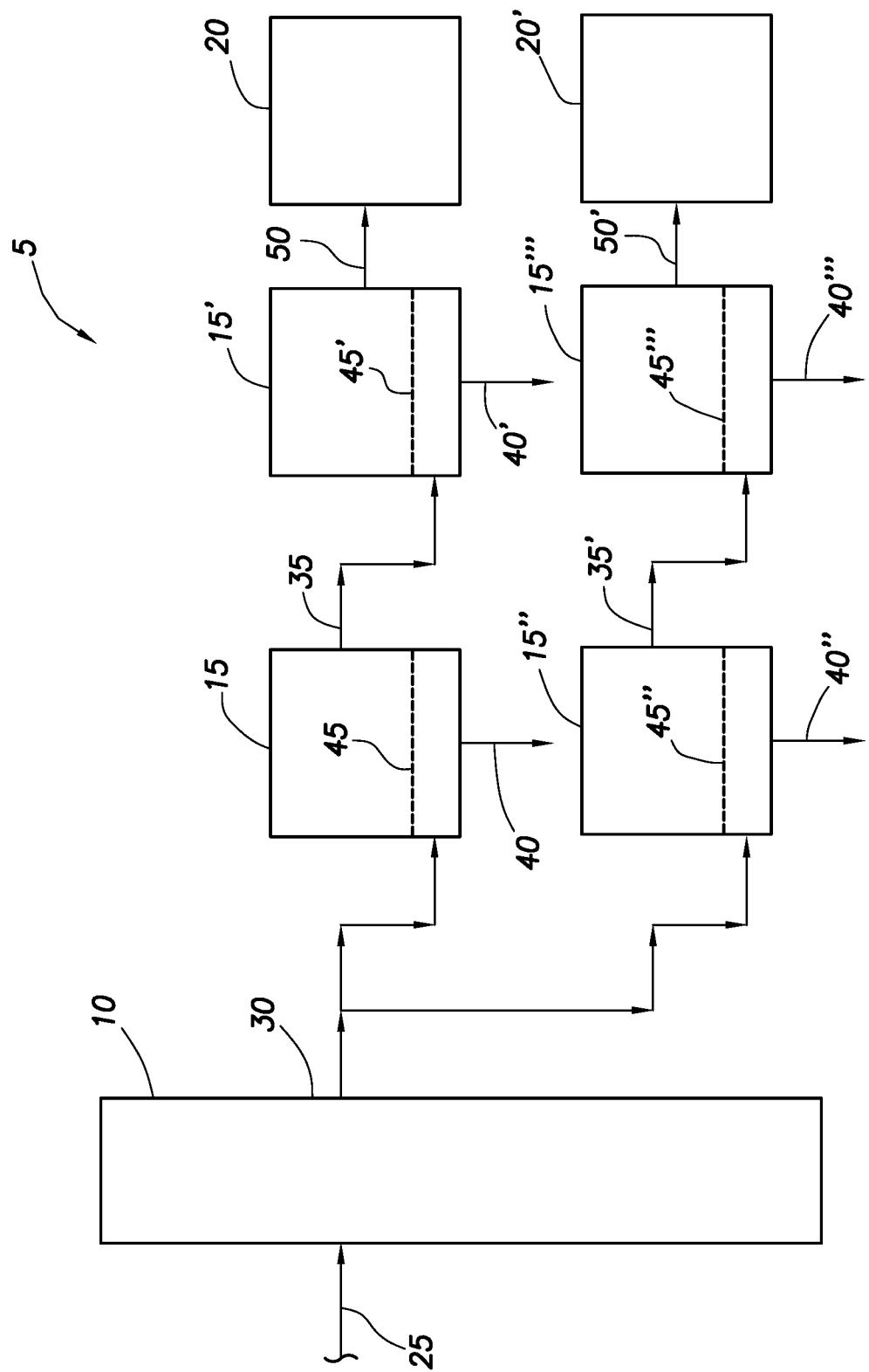
FIG. 4 illustrates an embodiment of a contaminant removal system having vacuum boxes disposed in series and parallel configurations.

FIG. 4 illustrates an embodiment of contaminant removal system 5 having a parallel and series vacuum box 15 configuration. In such an embodiment, contaminant removal system 5 includes vacuum boxes 15, 15' in the series configuration with each other and vacuum boxes 15", 15''' in the series configuration with each other. Vacuum boxes 15, 15' are in the parallel configuration to vacuum boxes 15", 15'''. Vacuum boxes 15, 15', 15", 15''' may be the same size and configuration or different sizes and configurations. In an embodiment, vacuum boxes 15, 15" are of the same size and configuration, and vacuum boxes 15' and 15''' (e.g., the successive vacuum boxes) are of a smaller size. In the embodiment as shown, contaminated vapor 30 is introduced to vacuum boxes 15, 15" in which water removal devices 45, 45" (e.g., demister pads) facilitate removal of waters 40, 40" from contaminated vapor 30. Reduced water vapors 35, 35' are then introduced to the successive (e.g., downstream) vacuum boxes 15', 15''' in which water removal devices 45', 45''' facilitate removal of waters 40', 40''' from reduced water vapors 35, 35'. Further reduced water vapors 50, 50' exit vacuum boxes 15', 15'''. In embodiments as shown, further reduced water vapors 50, 50' are introduced to thermal destruction devices 20, 20'. In alternative embodiments (not shown), further reduced water vapors 50, 50' are introduced to the same thermal destruction device 20. Vacuum boxes 15, 15', 15", and 15''' may all be disposed on the same transportation means (e.g., all disposed on the same trailer) or on two or more transportation means. In embodiments, vacuum boxes 15, 15', 15", 15''' are all disposed on the same transportation means. In other embodiments, vacuum boxes 15, 15' are both disposed on the same transportation means, and vacuum boxes 15", 15''' are both disposed on another transportation means.

Figure 5:
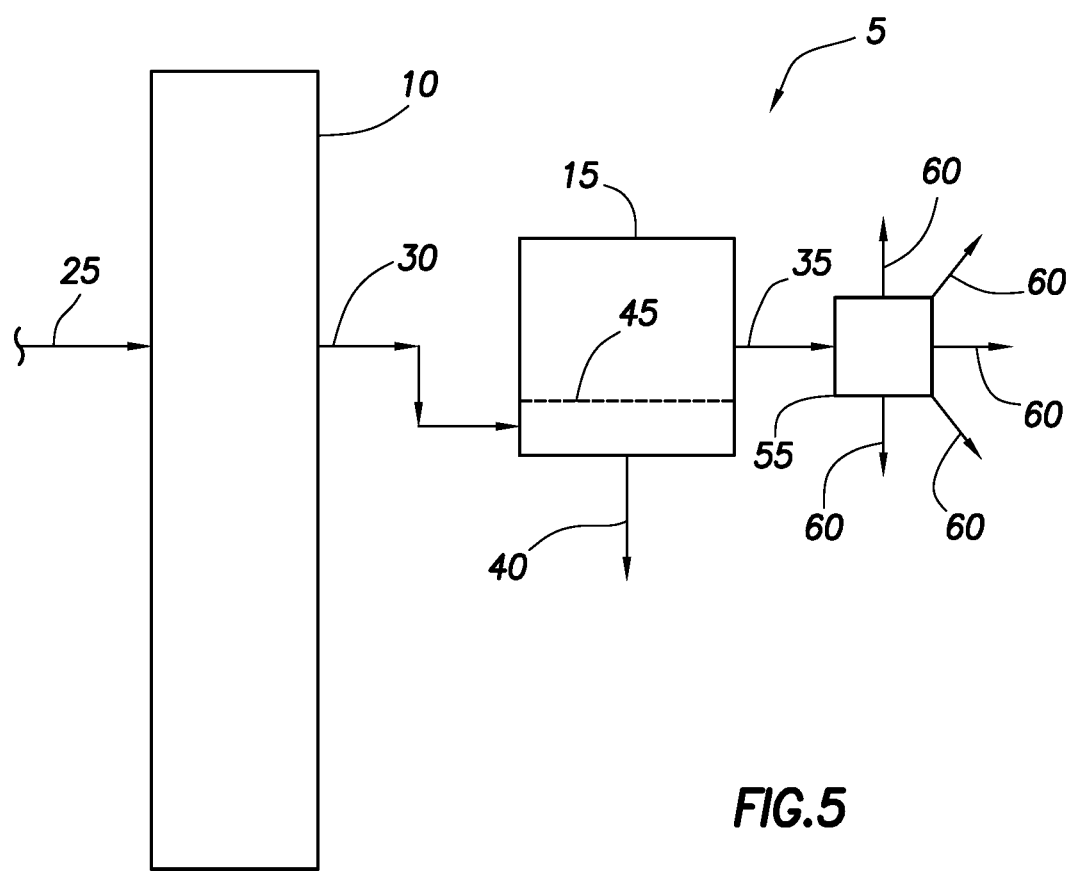
FIG. 5 illustrates an embodiment of a contaminant removal system having a vacuum box and a distributor.

FIG. 5 illustrates an embodiment of contaminant removal system 5 in which reduced water vapor 35 is fed to distributor 55. Distributor 55 may include any means suitable for separating reduced water vapor 35 into different vapor streams 60. In an embodiment, distributor 55 is a manifold. Distributor 55 may separate water vapor 35 into any desired number of vapor streams 60. In embodiments (not illustrated), each vapor stream 60 may be sent to a different downstream purpose such as, without limitation, one or more different thermal destruction devices 20. In some embodiments (not illustrated), contaminated vapor 30 may be introduced to distributor 55 prior to being fed to one or more than one vacuum box 15.

In an embodiment, vacuum box 15 is transportable. Vacuum box 15 may be transportable by any suitable means. Without limitation, examples of such means include by disposing vacuum box 15 on the bed of a vehicle (e.g., truck), on a trailer (e.g., attachable to a truck), or a freight wagon (e.g., a freight wagon attachable to a train locomotive). In an embodiment, vacuum box 15 is disposed on the bed of a trailer. Without limitation, a transportable vacuum box 15 allows vacuum box 15 to be used with different process equipment 10 in the facility. In addition, a transportable vacuum box 15 allows vacuum box 15 to be disposed in a desired close proximity to process equipment 10.

In some embodiments, process equipment 10 includes any equipment used in an industrial facility such as a refinery or chemical plant. In an embodiment, process equipment 10 includes any equipment that may have hydrocarbons. In embodiments, process equipment 10 includes a process tower, tanks, vessels, heat exchangers, and the like.

It is to be understood that embodiments of contaminant removal system 5 are not limited to the number of vacuum boxes shown in the figures. In alternative embodiments, contaminant removal system 5 may include any desired number of vacuum boxes in parallel and/or in series configurations.

Contaminated vapor 30, reduced water vapor 35, further reduced water vapor 50, and vapor stream 60 may flow between equipment (i.e., from process equipment 10 to vacuum box 15) by any suitable means. In an embodiment, such suitable means includes through hoses. In embodiments, the hoses are hoses that may operate with a vacuum. In some embodiments, the hoses are stainless steel braided hoses. In other embodiments, one or more of the hoses has one or more valves. In embodiments, each hose has a valve. In some embodiments, contaminant removal system 5 includes hard-piping instead of hoses.

Embodiments include using contaminant removal system 5 after process equipment 10 has been removed of heavy hydrocarbons (e.g., de-oiled), and remaining hydrocarbons and other contaminants are to be removed from process equipment 10. The hydrocarbons and other contaminants may be removed from process equipment 10 for any desired reason such as for a plant turnaround, maintenance, manual access to the process equipment, and the like.

Although the present invention and its advantages have been described in detail, it should be understood that various changes, substitutions and alterations may be made herein without departing from the spirit and scope of the invention as defined by the appended claims.

What is claimed is:

1. A contaminant removal apparatus, comprising:
 a first vacuum box, wherein the first vacuum box comprises a first vessel, wherein the first vessel comprises a top surface and a bottom surface;
 a second vacuum box, wherein the second vacuum box comprises a second vessel, wherein the second vessel comprises a second top surface and a second bottom surface;
 a first water removal device disposed in the first vacuum box, wherein a portion of vapor is introduced to the first vacuum box on an opposing side of the first water removal device from a vapor exit from the first vacuum box, and
 a second water removal device disposed in the second vacuum box, wherein a second portion of vapor is introduced to the second vacuum box on an opposing side of the second water removal device from a second vapor exit from the second vacuum box.

2. The contaminant removal apparatus of claim 1, wherein the first vacuum box comprises a first pressure vessel and the second vacuum box comprises a second pressure vessel.

3. The contaminant removal apparatus of claim 2, wherein the first and second pressure vessel comprise steel.

4. The contaminant removal apparatus of claim 1, wherein the first and second vacuum box further comprise an entry angle, and wherein the entry angle is from about 30 degrees to about 90 degrees.

5. The contaminant removal apparatus of claim 1, wherein the first and second vacuum box further comprise an entry angle, and wherein the entry angle is from about 45 degrees to about 90 degrees.

6. The contaminant removal apparatus of claim 1, wherein the first and second vacuum box further comprise a target water level and a bottom portion, and wherein the target water level is about at or below an elevation at which the portion of vapor or second portion of vapor is introduced to the first vacuum box or the second vacuum box.

7. The contaminant removal apparatus of claim 6, wherein the target water level is between about 50% and about 85% of a height of the bottom portion.

8. The contaminant removal apparatus of claim 6, wherein the target water level is between about 70% and about 80% of a height of the bottom portion.

9. The contaminant removal apparatus of claim 1, wherein the first water removal device extends about horizontally across the first vacuum box and the second water removal device extends horizontally across the second vacuum box.

10. The contaminant removal apparatus of claim 1, further comprising a first and a second water level measurement device.

11. A method for removing contaminants from process equipment, comprising:
  (A) introducing steam to the process equipment to provide a contaminated vapor;
  (B) introducing a portion of the contaminated vapor to a first vacuum box, wherein the portion of the contaminated vapor comprises steam and hydrocarbons, wherein the first vacuum box comprises a first pressure vessel;
  (C) introducing a second portion of the contaminated vapor to a second vacuum box, wherein the second portion of the contaminated vapor comprises steam and hydrocarbons, wherein the second vacuum box comprises a second pressure vessel;
  (D) removing water from the portion of the contaminated vapor, wherein the first vacuum box comprises a first water removal device, and wherein the first water removal device removes water from the portion of the contaminated vapor to provide water and a reduced water vapor; and
  (E) removing water from the second portion of the contaminated vapor, wherein the second vacuum box comprises a second water removal device, and wherein the second water removal device removes water from the second portion of the contaminated vapor to provide water and a second reduced water vapor;
  (F) removing the water and the reduced water vapor from the first vacuum box, wherein the reduced water vapor is removed from an opposing side of the first vacuum box from a side of the first vacuum box at which the portion of the contaminated water is introduced to the first vacuum box, and
  (G) removing the water and the second reduced water vapor from the second vacuum box, wherein the second reduced water vapor is removed from an opposing side of the second vacuum box from a side of the second vacuum box at which the second portion of the contaminated water is introduced to the second vacuum box.

12. The method of claim 11, wherein the first and second pressure vessel comprise steel.

13. The method of claim 11, wherein the contaminated vapor is introduced to the first and second vacuum box at an entry angle, and wherein the entry angle is from about 30 degrees to about 90 degrees.

14. The method of claim 11, wherein the contaminated vapor is introduced to the first and second vacuum box at an entry angle, and wherein the entry angle is from about 45 degrees to about 90 degrees.

15. The method of claim 11, wherein the first and second vacuum box further comprise a target water level and a bottom portion, and wherein the target water level is about at or below an elevation at which the contaminated vapor is introduced to the first and second vacuum box.

16. The method of claim 15, wherein the target water level is between about 50% and about 85% of a height of the bottom portion.

17. The method of claim 15, wherein the target water level is between about 70% and about 80% of a height of the bottom portion.

18. The method of claim 11, wherein the water is removed by a demister pad, and wherein the demister pad extends about horizontally across the first and second vacuum box.

19. The method of claim 11, further comprising measuring a water level in the first and second vacuum box with a first and second water level measurement device.

20. The method of claim 11, wherein the first vacuum box and the second vacuum box are different sizes.

* * * * *